United States Patent

[11] 3,591,162

| [72] | Inventor | Friedrich Bauer<br>Vienna, Austria |
|---|---|---|
| [21] | Appl. No. | 838,241 |
| [22] | Filed | July 1, 1969 |
| [45] | Patented | July 6, 1971 |
| [73] | Assignee | Hoerbiger Ventilwerke Aktiengesellschaft |
| [32] | Priority | July 12, 1968 |
| [33] | | Austria |
| [31] | | 10 A 6746/68 |

[54] RAISED SPRING DISC
4 Claims, 3 Drawing Figs.

[52] U.S. Cl. .................................................... 267/161
[51] Int. Cl. ...................................................... F16f 1/34

[50] Field of Search. ' ............... ...................... 267/159, 160, 161

[56] References Cited
UNITED STATES PATENTS

| 1,176,632 | 3/1916 | Werner ......................... | 267/161 |
| 3,114,388 | 12/1963 | Hoen............................. | 267/161 |

*Primary Examiner*—James B. Marbert
*Attorney*—Watson, Cole, Grindle & Watson

ABSTRACT: A raised spring disc intended for compressor valves having at least two concentric rings connected together by radial webs subdividing the rings into several ring sections. All or part of the ring sections are bent out of the plane of the disc to form waves.

PATENTED JUL 6 1971 3,591,162

Inventor
Friedrich Bauer
By
Watson, Cole, Grindle + Watson
Attys.

RAISED SPRING DISC

The invention relates to raised spring discs for compressor valves such discs having at least two concentric rings connected together by at least three radial webs.

It is known that raised spring discs differ from spring discs with spring tongues bent out of the disc plane, firstly, in that the disc rings are not divided and the spring force is engendered by the three-dimensional shaping of the disc itself. Known spring discs of this type are either in the shape of Belleville washers or convex in the form of a cylindrical surface. Also, in the case of single-ring valves, corrugated ring springs are used, consisting of a single corrugated ring. In raised spring discs, practically the entire cross section of the material is used for the spring work, while the rubbing of the edges into the adjacent valve plate is avoided, and substantially no torque is exerted on the loaded valve plate.

Many different types of known spring discs have been in satisfactory use for many years. However, in certain cases they do not meet all the requirements applicable to the spring system. Thus, cylindrically convex spring discs rest, in particular in the case of comparatively large valves, on the area about a single disc diameter so that adequate parallel guiding of the valve plate is not always ensured, although this arrangement was found advantageous in other cases. Disc springs of the Belleville washer type and corrugated ring springs are comparatively stiff so that the required spring force and spring stiffness of the valve spring system cannot always be achieved, and their use is confined mostly to single-ring valves.

In a spring disc according to the invention, the ring sections between the webs of a pair of radially adjacent rings are pulled out of the plane of the disc to form waves, on opposite faces of the disc. It is advantageous if the radially consecutive ring sections are pulled out of the plane of the disc on opposite faces of the disc respectively. According to a further feature of the invention, the ring sections consecutive in the circumferential directions of any given ring may be alternately pulled out of the plane of the disc on opposite faces of the disc.

The arrangement of a spring disc in accordance with the invention provides, on the one hand, a more uniform distribution of the spring forces over the disc surface, with fuller utilization of the disc material, while the spring disc rests on the valve plate not along a single diameter, but at several points, in accordance with the subdivision of the spring disc into several ring sections. This provides comparatively accurate parallel guiding of the valve plate during the compressor stroke, in particular also with larger valve diameters, for instance, with the outside valves of concentric valve sets, where the loading along a single diameter is sometimes disadvantageous. On the other hand, a spring disc according to the invention is softer than a Belleville washer or a conventional corrugated ring spring of the same size and thickness. Since the radial webs of the spring disc according to the invention are approximately centrally between the valve plate and the valve plate stop in one plane, when the valve is closed, an advantageous damping of the opening beats of the valve plate is also achieved. Rubbing in of the edges and application of torques to the valve plate during the working of the valve is also avoided. Moreover, if the circumferentially consecutive raised spring sections are bent out of the disc plane alternately on opposite faces of the disc, a substantially uniform distribution of the spring force over the disc width is achieved.

The accompanying drawings show two embodiments of the invention.

Figure 1:
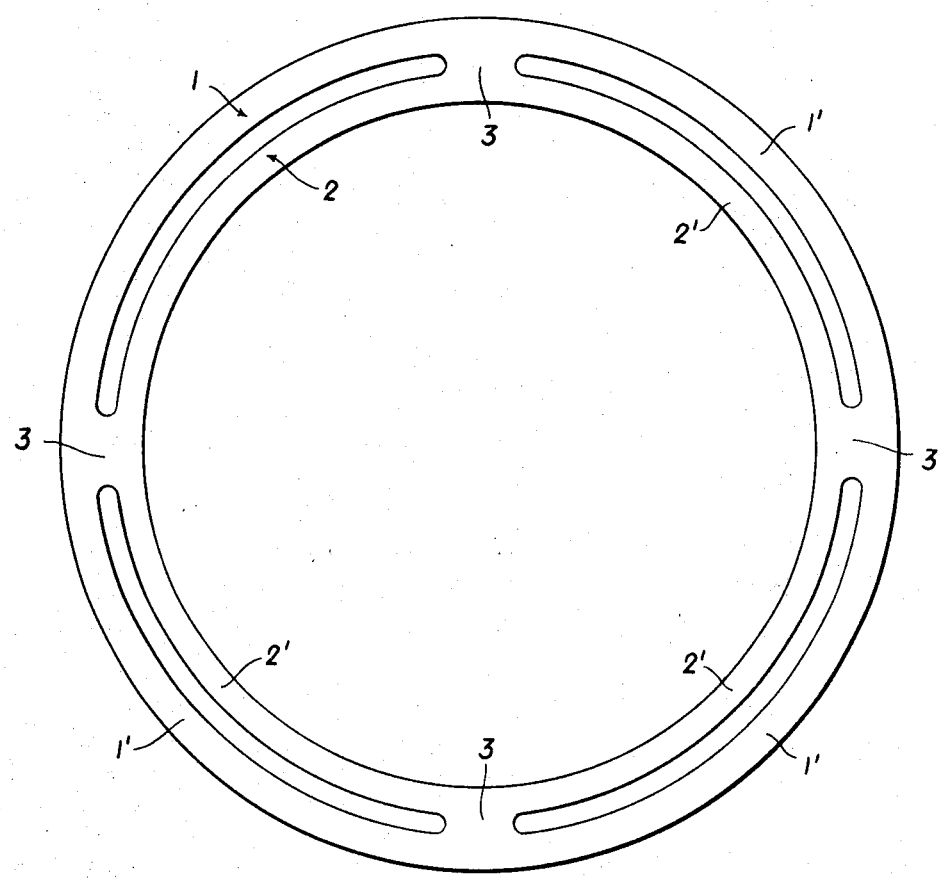
FIG. 1 is a plan view of a spring disc according to the invention.

According to FIG. 1, a spring disc has two concentric rings 1 and 2 connected together by four radial webs 3. Each ring 1 and 2 is subdivided by the webs into four ring sections of equal lengths, extending approximately over an arc of 90°, and indicated by the numbers 1', 2'. The individual ring sections 1' and 2' are bent in opposite directions out of the plane of the disc, more or less in the shape of waves.

Figure 2:
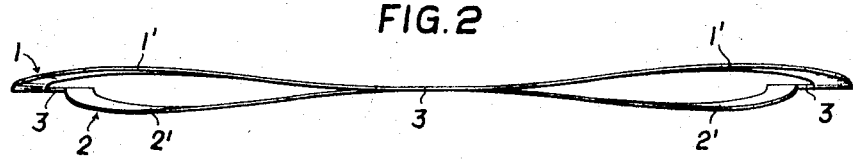
FIG. 2 is a side view of the disc shown in FIG. 1.
Figure 3:
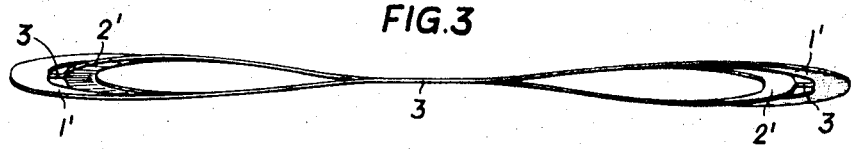
FIG. 3 is a side view of another form of disc.

In the embodiment according to FIG. 2, all ring sections 1' of the external ring 1 are bent upward out of the plane of the disc, while the ring sections 2' of the inner disc ring 2 have a downward curvature, this being accordingly opposite the direction of the curvature of the ring sections 1'. The radial webs 3 are all approximately in the original plane of the spring disc. According to FIG. 3, the circumferentially consecutive ring sections of the two rings 1 and 2 are alternately bent out of the plane of the disc on opposite sides of the disc. In the left-hand half of FIG. 3, the front ring section 1' of the outer ring 1 is bent downward and the rear ring section of the same ring is bent upward out of the plane of the disc, while the front ring section 2' of the inner ring is bent upward and the rear ring section of the same ring downward. On the right-hand side of FIG. 3, on the other hand, the front ring section 1' and the rear ring section 2' are bent upward and the rear ring section 1' and the front ring section 2' are bent downward.

In the two illustrated embodiments, each ring 1 or 2 of the spring disc has four half-waves adapted to rest with their central part on valve components adjacent to the spring disc, that is to say, on the one hand on a valve plate and on the other hand on a stop or on a damper or guide plate between the stop and the spring disc. This provides a comparatively uniformly distributed loading of the valve plate over the circumference of the valve, by the spring disc according to the invention. In the arrangement according to FIG. 2, only one of the two rings rests on four different points of the valve plate, while the other ring rests in the same way on the stop. In the case of the circumferentially alternating raised ring section of any given ring in accordance with FIG. 3, each ring rests both on the valve plate and on the stop, in each case at two diametrally opposite points. The supporting areas of the two rings, however, are staggered by about 90° in the circumferential direction so that even in this case substantially uniform distribution of the loading over the circumference of the valve plate and also substantially uniform loading over the width of the valve plate is achieved.

The invention is not confined to the spring discs herein described, with two concentric rings and four radial joining webs. It can be applied to any multiring disc with two or more concentric rings and any number of radial joining webs. There must be at least three radial webs distributed over the circumference of the spring disc however, so that loading of the valve plate distributed over more than two points is achieved. Naturally, in the case of spring disc consisting of several concentric rings, some of the rings may be left flat.

I claim:

1. A spring disc for compressor valves comprising at least two concentric rings connected together by at least three radial webs, each concentric ring having ring sections between adjacent webs and each ring section of at least a pair of rings being bent out of a plane containing the webs, a number of the sections being bent in one direction so that the spring disc has a wavelike appearance in side view.

2. A spring disc according to claim 1, in which a pair of radially adjacent ring sections are bent out of the said plane in opposite directions respectively.

3. A spring disc according to claim 1, in which circumferentially adjacent ring sections of a ring are bent out of said plane in opposite directions respectively.

4. A spring disc according to claim 1, in which both radially adjacent ring sections and circumferentially adjacent ring sections are alternately bent out of said plane in opposite directions.